US010574597B2

(12) United States Patent
Johnson, Jr. et al.

(10) Patent No.: US 10,574,597 B2
(45) Date of Patent: Feb. 25, 2020

(54) CONVERSATIONAL LOG REPLAY WITH VOICE AND DEBUGGING INFORMATION

(71) Applicant: Microsoft Technology Licensing, LLC, Redmond, WA (US)

(72) Inventors: Joseph Edwin Johnson, Jr., Seattle, WA (US); Matthew W Schuerman, Kirkland, WA (US); Donald Frank Brinkman, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/707,823

(22) Filed: Sep. 18, 2017

(65) Prior Publication Data

US 2019/0089656 A1 Mar. 21, 2019

(51) Int. Cl.
*H04L 12/58* (2006.01)
*G06N 5/00* (2006.01)
(Continued)

(52) U.S. Cl.
CPC .......... *H04L 51/02* (2013.01); *G06F 17/279* (2013.01); *G06N 5/003* (2013.01); *G06Q 10/04* (2013.01); *G10L 13/08* (2013.01); *G10L 15/26* (2013.01)

(58) Field of Classification Search
CPC ........ H04L 51/02; G06N 5/003; G10L 13/08; G10L 15/26; G06Q 10/04; G06F 17/279
See application file for complete search history.

(56) References Cited

U.S. PATENT DOCUMENTS

2004/0111479 A1* 6/2004 Borden ............... G06Q 10/107
709/206
2015/0350451 A1* 12/2015 Aue ..................... H04M 3/568
379/202.01

(Continued)

OTHER PUBLICATIONS

Oh et al., "A Chatbot for Psychiatric Counseling in Mental Healthcare Service Based on Emotional Dialogue Analysis and Sentence Generation", 2017 IEEE 18th International Conference on Mobile Data Management, (Year: 2017).*

*Primary Examiner* — Arvin Eskandarnia
*Assistant Examiner* — Chhian (Amy) Ling
(74) *Attorney, Agent, or Firm* — Schwegman Lundberg & Woessner, P.A.

(57) ABSTRACT

Methods, systems, and computer programs are presented for providing a user interface (UI) for monitoring and debugging an Artificial Intelligence (AI) chatting hot. One method includes operations for receiving a selection on the UI to replay an electronic conversation between a first and a second party, selecting conversation data associated with the electronic conversation from a data log having conversation data from several electronic conversations, and analyzing the conversation data to identify conversation parameters. The conversation parameters include text in each entry of the electronic conversation, timing of the entries, and debugging parameters for each entry. The method further includes an operation for causing presentation of the electronic conversation on the UI, which includes presenting the text of each entry, the audio corresponding to speech associated with each entry timed according to the timing of the entry, and the debugging parameters embedded within the presented text.

23 Claims, 9 Drawing Sheets

(51) Int. Cl.
*G06F 17/27* (2006.01)
*G06Q 10/04* (2012.01)
*G10L 15/26* (2006.01)
*G10L 13/08* (2013.01)

(56) References Cited

U.S. PATENT DOCUMENTS

2015/0356836 A1* 12/2015 Schlesinger ............. G08B 3/10
                                                           704/235
2016/0294755 A1* 10/2016 Prabhu .................... H04L 51/12
2018/0357309 A1* 12/2018 Eidem ................... H04L 67/141

* cited by examiner

CONVERSATIONAL LOG REPLAY WITH VOICE AND DEBUGGING INFORMATION

TECHNICAL FIELD

The subject matter disclosed herein generally relates to methods, systems, and programs for monitoring chatbots, and, more particularly, methods, systems, and computer programs for monitoring and debugging an Artificial Intelligence (AI) conversational chatbot.

BACKGROUND

Artificial Intelligence (AI) conversation programs, sometimes referred to as chatbots, provide casual conversations with humans. The chatbots can chime into the conversation with context-specific facts about things like celebrities, sports, or finance, while showing empathy, a sense of humor, and a healthy helping of sass. The chatbot can also tell jokes, read a horoscope, provide facts, and much more.

However, since chatbots draw their knowledge from many sources, including social networks, the information collected may result in negative or offensive language. To avoid misbehaving chatbots, mechanisms are put in place to track the performance of the chatbot and configure the chatbot to filter out offensive content.

Tracking the performance of the chatbot is difficult because there can be thousands or millions of users chatting with the chatbot, which creates a large amount of content to be examined. To monitor content, human labelers are used to flag potential problems. Also, machine learning algorithms and natural language processing techniques may be used for finding trouble that may appear during a conversation. In order to monitor user traffic, human labelers have to pay close attention to the logs that come in. This is especially important for blocking context in which a chatbot can say the wrong thing at the wrong time and bring down the brand that the chatbot represents. One problem with human monitoring of logs, however, is that it requires intense attention and focus and may become boring and monotonous, resulting in the possibility of failure.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
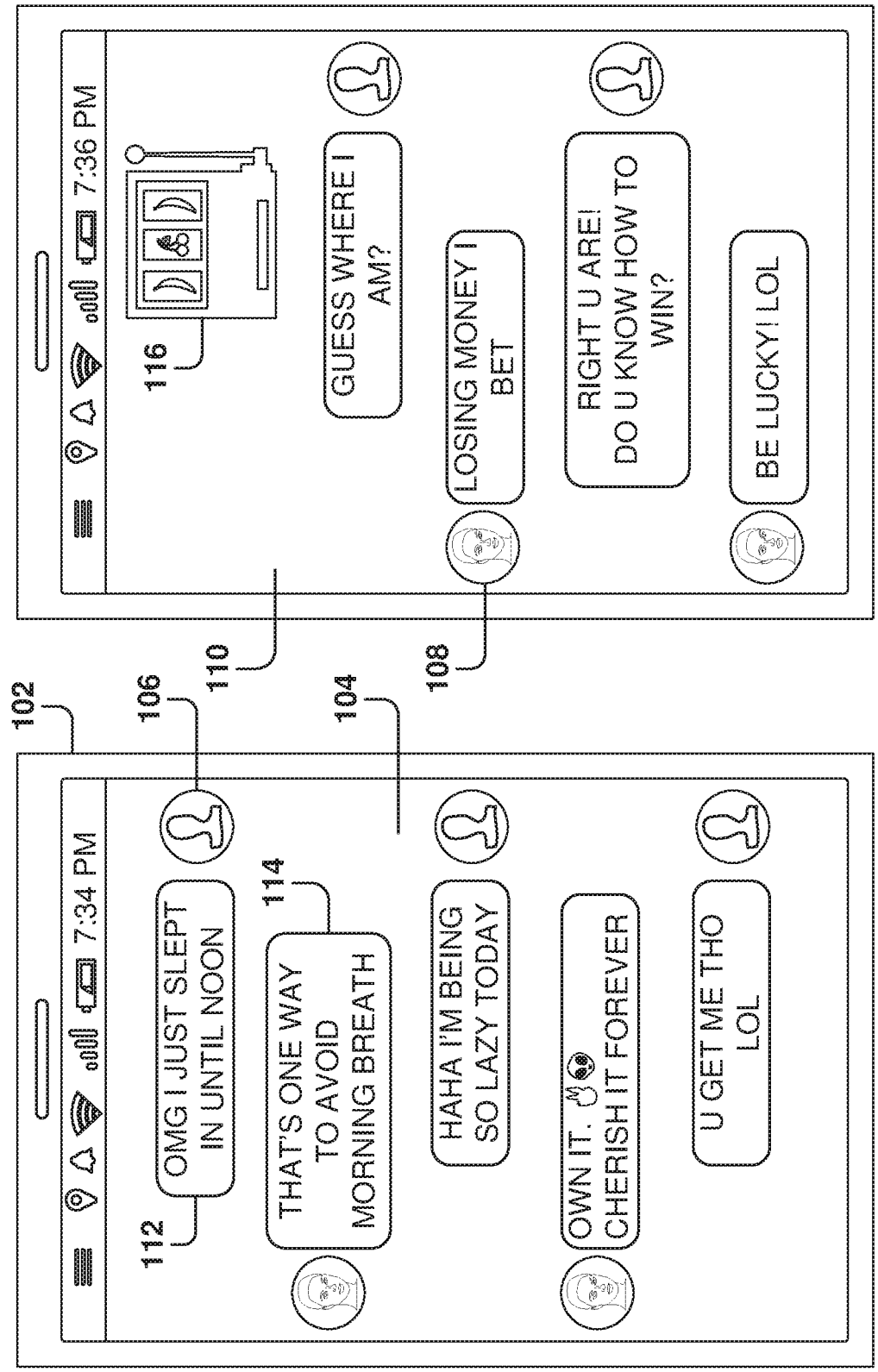
FIG. 1 is an example embodiment of an interface for a chatbot.

Example methods, systems, and computer programs are directed to providing a user interface for monitoring and debugging an AI chatting bot. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Chabot logs include semi-structured data that typically have both a question (Q) and an answer (A), which together are referred to as a turn or a QA pair. Thus, the chatbot data is conversational in nature. In some example embodiments, a user interface for reviewing logs is presented. The user interface is conservational, and the way in which the logs are replayed is also conversational (e.g., following turns and providing debugging information for each turn).

The goal of such a user interface is to make human workers that are reviewing the logs more productive in capturing data and nuances that would only appear by observing the conversational nature of the interaction of actual users with the actual chatbot, in a manner mimicking the user mode of interaction with the chatbot. This conversational log replay assists in improving the quality of the text-to-speech system, including filtering and dialogue systems, which results in great productivity increases in the human labelers performance for monitoring chatbot logs.

In one embodiment, a method for providing a user interface for monitoring and debugging the AI chatting bot is provided. The method includes operations for receiving a selection on a user interface to replay an electronic conversation between a first party and a second party, and for selecting conversation data associated with the electronic conversation from a data log comprising conversation data from a plurality of electronic conversations. Further, the method includes an operation for analyzing the conversation data to identify conversation parameters. The conversation parameters include text in each entry of the electronic conversation, timing of each entry in the electronic conversation, and debugging parameters for each entry. In addition, the method includes an operation for causing presentation of the electronic conversation on the user interface. Presenting the electronic conversation includes presenting the text of each entry of the electronic conversation, presenting audio corresponding to speech associated with each entry, with the audio being timed according to the timing of the entry, and presenting the debugging parameters embedded within the presented text.

In another embodiment, a system includes a memory comprising instructions and one or more central processing units (CPUs). The instructions, when executed by the one or more CPUs, cause the one or more CPUS to perform operations comprising: receiving a selection on a user interface to replay an electronic conversation between a first party and a second party; selecting conversation data associated with the electronic conversation from a data log comprising conversation data from a plurality of electronic conversations; analyzing the conversation data to identify conversation parameters, the conversation parameters comprising text in each entry of the electronic conversation, timing of each entry in the electronic conversation, and debugging parameters for each entry; and causing presentation of the electronic conversation on the user interface. Presenting the electronic conversation includes presenting the text of each entry of the electronic conversation, presenting audio corresponding to speech associated with each entry, with the audio being timed according to the timing of the entry, and presenting the debugging parameters embedded within the presented text.

In yet another embodiment, a non-transitory machine-readable storage medium includes instructions that, when executed by a machine, cause the machine to perform operations comprising: receiving a selection on a user interface to replay an electronic conversation between a first party and a second party; selecting conversation data associated with the electronic conversation from a data log comprising conversation data from a plurality of electronic conversations; analyzing the conversation data to identify conversation parameters, the conversation parameters comprising text in each entry of the electronic conversation, timing of each entry in the electronic conversation, and debugging parameters for each entry; and causing presentation of the electronic conversation on the user interface. Presenting the electronic conversation includes presenting the text of each entry of the electronic conversation, presenting audio corresponding to speech associated with each entry, with the audio being timed according to the timing of the entry, and presenting the debugging parameters embedded within the presented text.

FIG. 1 is an example embodiment of an interface for a chatting bot. FIG. 1 includes user interfaces 104 and 110, as shown on a device 102, provided for the conversation between user 106 and chatbot 108. The conversation includes a typical QA session, although other embodiments may include conversations where the user 106 or the chatbot 108 may provide more than one entry within a turn.

In this exemplary embodiment, the user 106 enters a comment 112, "omg I just slept in until noon," and the bot replies 114, "that's one way to avoid morning breath." The conversation continues as the user provides additional entries. The conversation may include multimedia items, such as picture 116, videos, music clips, web addresses, emoticons, and the like. In other example embodiments, the conversation with the chatbot may be performed via speech; e.g., the user inputs a voice clip (e.g., recorded on the computer device 102) and the chatbot 108 replies with speech. In some example embodiments, the chatbot may convert the speech from the user to text and present it on the screen, and the chatbot 108 may provide both text and speech outputs.

The phrasing of the conversations should sound natural, idiomatic, and human in both text and voice modalities. In some example embodiments, the chatbot's "mind" is a sophisticated array of multiple machine learning (ML) techniques, working in sequence and in parallel to produce a unique, entertaining and, at times, very human conversational experience.

One of the challenges with conversational speech is that the chatbot may mispronounce one or more words. In order to detect these problems, embodiments present a replay of the log that includes the speech provided by the chatbot in order to detect anomalies. Another challenge for debugging chatbot content is that the chatbot may include language that is offensive or inappropriate. Another challenge is to build a voice chatbot, which is able to use all kinds of different data and still sound good, appropriate, logical, and not offensive.

Figure 2:
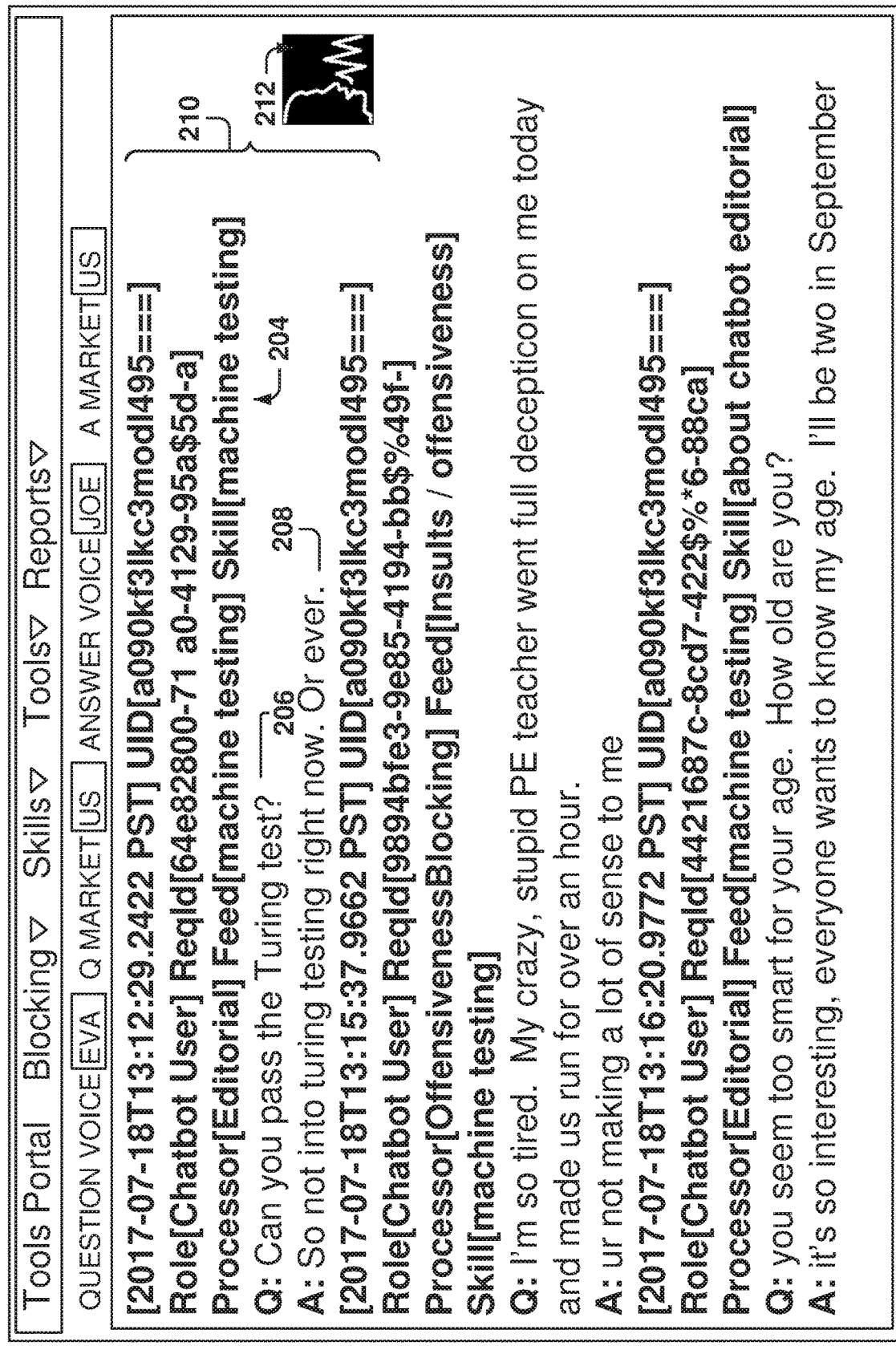
FIG. 2 is an interface for presenting conversation logs, according to some example embodiments.

FIG. 2 is a log-replay user interface 202 for presenting conversation logs, according to some example embodiments. The log-replay user interface 202 presents the log in textual and audio formats simultaneously. As the text is presented on the display, the speech 212 corresponding to the text of the conversation is output on one or more speakers.

In some example embodiments, each turn 210 includes debugging parameters 204, an entry 206 by the user (referred to as Q), and a response 208 by the chatbot. The debugging parameters 204 include information about the conversation and the turn, and may include one or more of a timestamp, a feed identifier, a filtered topic identifier for a topic filtered (e.g., blocked) during the electronic conversation, a processor (e.g., computing device) which processed the Q, a bug on the code detected during the conversation, a request identifier which uniquely identifies the entry in the database log, a source of the data used for forming the response, a feed identifier which uniquely identifies the conversation from other conversations, a skill identifier which uniquely identifies a configuration utilized when the answer was created, a speech converter configuration identifier, and other metadata that may be utilized for debugging purposes.

The log-replay user interface 202 uses the audio to replay the logs in a turn-by-turn fashion. Text-to-speech technology is used to synthesize the text-based logs into audio logs. The audio logs may be played automatically one after the other as if the user conversation were something similar to playing an audio book. However, unlike in an audiobook, replaying the conversation may include one voice being played over the other if, for example, the user interrupts (e.g., enters text or speaks) the chatbot before the chatbot finishes its answer.

In some example embodiments, the voice of the user and the voice (e.g., voice fonts) of the chatbot are made very distinct, so it is easy to identify whose turn it is. For example, the user may be given a male voice and the chatbot a female voice, or vice versa, or the chatbot may be given the voice of a child and the use the voice of an adult, or the voice of the user may be given a heavy accent from a foreign speaker. In some example embodiments, a plurality of voice fonts is provided and the user may select the voice for both the user and the chatbot. Further yet, in some example embodiments, emotion may be added to the replay of the voice, such that the replay reflects emotions or feelings, such as an angry voice, a happy voice, a sad voice, and the like.

Although the user may be speaking to the chatbot and a voice log is available with the speech of the user, the replay of the user voice is done by using a text-to-speech conversion using a different voice font. This way, the privacy of the user is protected. However, in some example embodiments, the voice of the user may be made available to the monitor upon demand in order to detect understanding problems by the chatbot, which may interpret the input speech erroneously.

The interaction of the chatbot with the user is modelled in this way using voice turns, recreating a conversational dialogue between users for presentation to the human labelers or monitors. Other log utilities do not provide this conversational aspect and lack the ability to provide the audio representations.

A great advantage with the log-replay user interface 202 is that the monitors can listen "passively" while multitasking and performing other tasks (e.g., debugging engineers writing code while listening for potential anomalies). Or the debuggers may simultaneously be scrolling through other logs and increase their productivity (e.g., reading one set of logs and listening to a different set). It is rioted that the chatbot may be having conversations with hundreds of thousands of users at one time, so monitoring such large amounts of log data is a daunting task, which is facilitated by the features provided by the log-replay user interface 202.

The log data is replayed in a way that extracts the most amount of value both for the user experience to be fixed, and for the bots' training to be corrected. It acts as a closed-loop system that takes the input logs, organizes them in a way that makes it extremely efficient for processing, and mimics the way in which the logs are being gathered.

Other log systems are text based and the debugger has to give her complete attention to the debugging task. The log user interface presented here provides more information than simply running a text log through a text-to-speech converter. For example, the converter would not be able to provide different voice fonts for each of the users. Further, the debugging parameters 204 enable quick resolution of problems by being able to pinpoint exactly how the system was operating when a fault took place. Additionally, the text-to-speech converter would try to pronounce all the debug parameters, which would sound like gibberish and unpronounceable content. The user interface provides a mixed-mode representation where debug information is simultaneously presented on the screen, which is useful to the developer, but what comes out through the audio is the subset of data that is pronounceable (e.g., emotion detected). This way, if the monitor hears a bug, the monitor may quickly troubleshoot based on the details about the context where the hug took place.

During testing of the chatbot, problems arose when the chatbot provided inappropriate responses (e.g., racist) because the chatbot gathered data and knowledge from a wide variety of sources, some of which correspond to unfiltered inputs created by users (e.g., Twitter). Although some monitors were utilized, the volume of data was so large that it was not possible to monitor all the data. This is why providing an easy to use log interface, with replay of voice and inclusion of debugging parameters, facilitates the monitoring of conversations, such as by running conversations on the background while the monitor multitasks.

In the example of FIG. 2, a question from the user includes the expression "My crazy, stupid PE teacher went full decepticon on me today and made us run for over an hour." Because of the words "crazy" and "stupid," the chatbot identified a sensitive topic and a debugging parameter of "Insults/offensiveness" is included within the feed. In this case, the chatbot properly responded with an evasive answer. If the chatbot had not responded appropriately, the debugger would have been able to identify the problem quickly. It is noted that in some example embodiments, some of the important debugging parameters (e.g., "racism") may also be included in the speech part of the replaying of the log. Further, the human labeler may observe the answer from the chatbot and decide that a better answer could have been provided instead. In that case, the labeler may escalate the problem to be solved by the development team.

In addition, monitoring the log replay may facilitate the detection of words that may be mispronounced by the chatbot. Since the users may utilize informal language, acronyms, abbreviations, emoticons, voice clips, music clips, and even binary language, the chatbot has to be able to interpret these variety of inputs and respond accordingly.

As mentioned earlier, the conversation may include images, and, in some example embodiments, the replay log may perform image recognition to provide a description of the image for the human monitor. For example, the replay may include speech saying, "image with a cat sitting on a fence," or, "image with a swastika." This way, content analysis may also be performed on the images.

Figure 3:
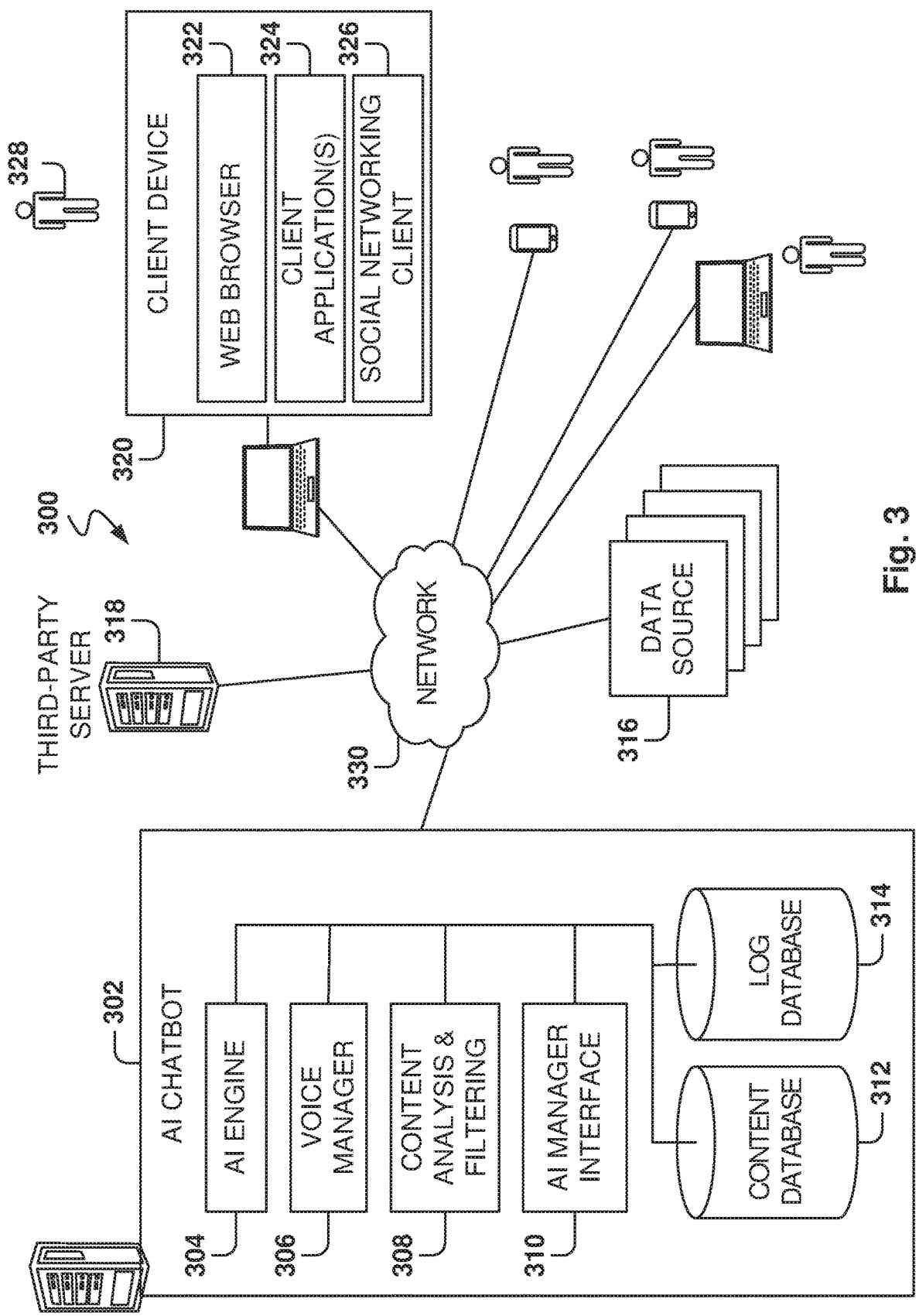
FIG. 3 is a block diagram illustrating a networked system, according to some example embodiments.

FIG. 3 is a block diagram illustrating a networked system 300, according to some example embodiments. The networked system 300 includes AI chatbot 302, a plurality of client devices 320, a network 330, a plurality of data sources 316, and one or more third-party servers 318.

The AI chatbot 302 includes an AI engine 304, voice manager 306, content analysis and filtering 308, AI manager interface 310, and a plurality of databases, which includes a content database 312 and a log database 314.

The AI engine 304 is the engine that creates the chatbot answers and coordinates the activities of the different modules within AI chatbot 302. The voice manager 306 includes facilities for translating text to speech and speech to text, and management of the different voices utilized by the chatbot and by the log replay.

Further, the content analysis and filtering 308 monitors the content in the conversation and analyzes the data to identify inappropriate materials and provides filtering capabilities to avoid inappropriate conversation by the chatbot. The AI manager interface 310 provides an interface for managing the AI chatbot 302, including options for configuration, voices, data storage, and so forth. In addition, the AI manager interface 310 provides the user interface for the log replay, as described above with reference to FIG. 2.

The content database 312 includes content that may be utilized by the chatbot to form answers, although the chatbot may also obtain information from other data sources 316 and third-party servers 318 (e.g., Twitter and other social networks). The log database 314 keeps the logs for the chatbot, including one or more of textual information, voice information, multimedia information, and debugging parameters.

The network 330 may be used for communications between the AI chatbot 302, client device 320, third-party servers 318, and other data sources 316. In some example embodiments, the client device 320, utilized by user 328, includes one or more of a web browser 322, one or more client applications 324, and a social networking client 326. The web browser 322 may be utilized to interface with the AI chatbot 302, or a custom application 324 may be utilized for chatbot conversations. In some example embodiments, a social networking client 326 may be used to connect to social networks, and the conversations with the chatbot may be performed in the context of the social network.

Figure 4:
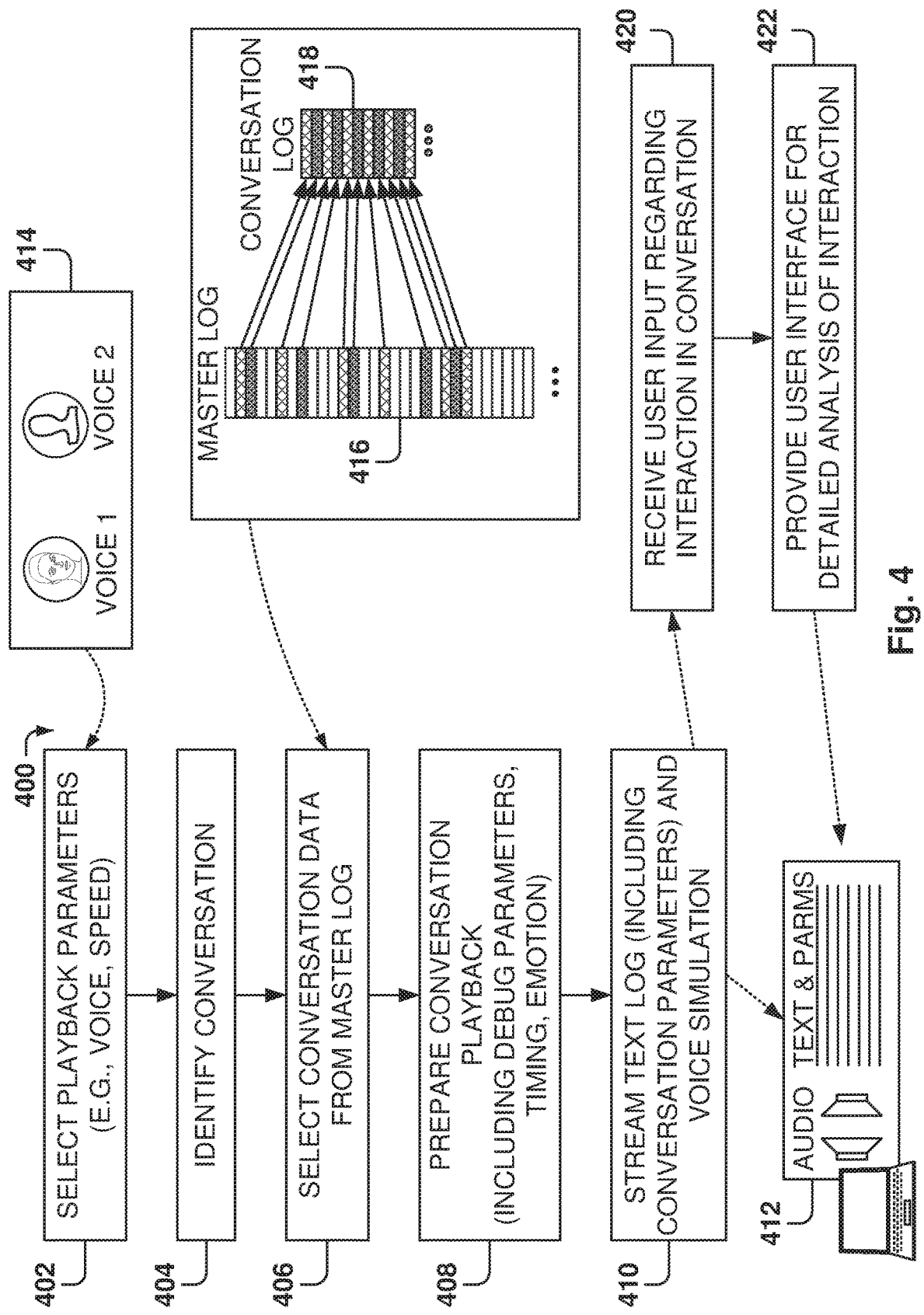
FIG. 4 illustrates the method for presenting chatbot conversation logs, according to some example embodiments.

FIG. 4 illustrates a method 400 for presenting chatbot conversation logs, according to some example embodiments. While the various operations in this flowchart are presented and described sequentially, one of ordinary skill will appreciate that some or all of the operations may be executed in a different order, be combined or omitted, or be executed in parallel.

At operation 402, a selection of playback parameters are received from the user or retrieved from a configuration file, such as by utilizing default replay options. The playback parameters may include voices 414 selected for speech representation, text fonts, debugging parameters presented embedded within the text stream, and so forth.

From operation 402, the method flows to operation 404, where a conversation is identified for replay in the replay log application. In some example embodiments, an automatic mode is available where a conversation is selected at random, followed by additional conversations, to provide a continuous stream of conversation replay. For example, conversation pieces of up to ten minutes may be selected for replay for review.

At operation 406, the data for the selected conversation is extracted from the master log 416. The master log 416 includes data collected from the conversations of the AI chatbot, and typically, the data is stored sequentially as the data is received in the database. Thus, at operation 406, the data 418 for the selected conversation is extracted from the master log 416.

From operation 406, the method flows to operation 408 to prepare the user interface for conversation playback based on the selected playback parameters at operation 402. In some example embodiments, the system models the emotional responses, from both the user and the chatbot, to represent each separate emotion detected in the conversation. For example, there is a happy voice font available for turns that are detected as happy, sad voice for sad turns, angry voice for angry returns, and so forth.

This emotional voice print provides additional context to the human labeler, beyond the plain text of the conversation. In addition, the replay application may detect arguments (e.g., high valence emotion) and, similar to a real conversation, choose to let one voice font talk on top of another. This is especially valuable in a "full-duplex" conversation context where users can interrupt each other and are not limited to walkie-talkie style conversations. Detecting when to interrupt includes monitoring the chatbot's emotional engagement while a sentence is being parsed. When the sentence suddenly includes a negative sentiment and high emotion, the chatbot may choose to interrupt the user, both in the live conversational setting and in the log replay setting.

At operation 410, the text log is streamed 412, together with the conversation debugging parameters in voice streaming. The new interface for presenting logs provides a conversational dialogue, which enables improving the quality of monitoring by making the detection of chatbot problems easier. This increases the productivity of the human labelers. The nature of the chat bot itself is conversational, so streaming a conversation is an excellent way of reviewing chatbot performance. Such an interface makes human workers more productive by capturing data and nuances that would only be apparent when observing the conversational nature of the interaction of the actual users with the chatbot.

For example, when anger is detected, providing the angry voice fonts quickly alerts the human monitor of the possibility of tension or problems. Knowing the emotion of the conversation may change the entire feel of the conversation. Further, by presenting signals of identified emotions in a particular intense conversation, it is possible to have a better perception of the user's experience.

In some example embodiments, a parameter may be configured to increase the speed of replay, for both text and voice. For example, the speed may be increased by 10% or 20%, or any value between 5% and 100%, The replay speed may also be slowed down at some points if something is not clear during replay.

It is also noted, that, in some example embodiments, periods of silence are omitted in order to have a continuous stream of text and audio. In some example embodiments, the periods of silence are omitted only if they are above the predetermined threshold (e.g., one second or half a second).

At operation 420, if an input is received from the user during the log replay, regarding an interaction within the conversation, a user interface is provided, at operation 422, for detailed analysis of the interaction. The detailed user interface may include additional debugging parameters and additional context. For example, the detailed user interface may provide additional status data from the processor that the chat what was executing on. A processor, in the context of the chatting bot, is a small program that is part of a larger list of programs that run logic, specific to various scenarios/domains, in order to help respond most appropriately to a user in a given scenario, optionally using surrounding context of current and previous user turns and messages to help form the reply. In this sense, processors may not return a reply at all, but still update internal meta-data, like a human would process and store information while listening to a conversation, but not respond with that information right away. However, this information may be used in a later response or action. These processors may be geared to image, voice, text, gesture, touch, haptic, smell, or even video (similar to human senses).

In some example embodiments, an option is provided in the user interface to escalate a potential problem. For example, if a human labeler detects an anomaly, the human labeler makes a selection of the user interface, and then a message is automatically created for escalation to an engineer or a second-level reviewer, where the message includes enough information to reproduce the conversation and the associated debugging parameters.

Figure 5:
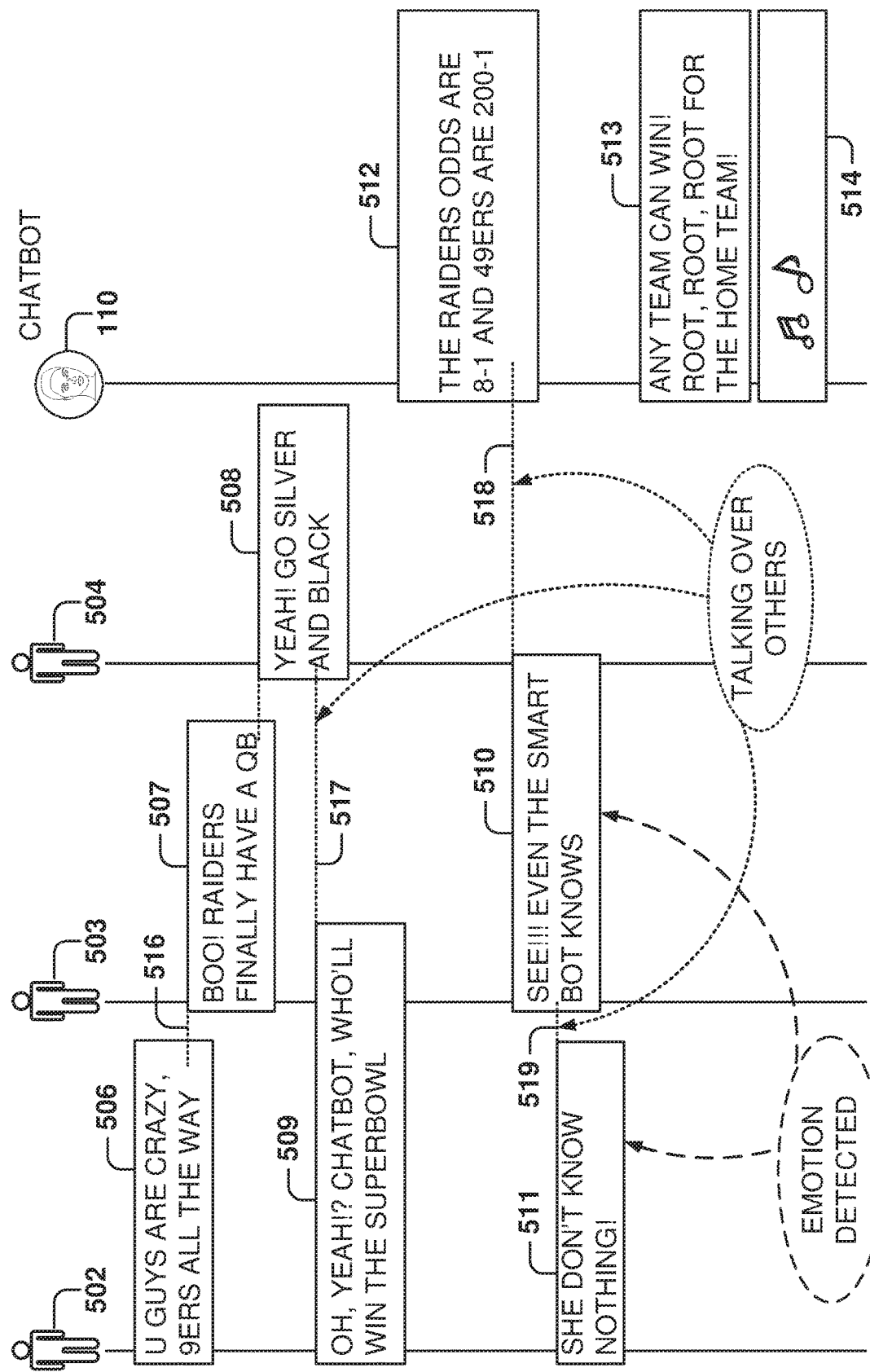
FIG. 5 illustrates a group conversation with the chatbot, according to some example embodiments.

FIG. 5 illustrates a group conversation with the chatbot, according to some example embodiments. One of the options of the chatbot is to converse within a group environment. In the example illustrated in FIG. 5, three users 502-504 are in a chat room with the chatbot 110. The diagram illustrates the different interactions between the members of the group, with a time component represented in the downward direction.

In this example, a conversation takes place around sports, where users cheer for different teams. At input 509, user 502 asks the chatbot, "who'll win the superbowl." The chatbot checks the odds in a sports website and replies 512 with the current odds of each team winning the Super Bowl.

The boxes representing user or chatbot inputs (e.g., 506-513) roughly represent timing on the vertical direction, wherein the height of the box represents the duration of the input. This way, it is illustrated how some users may be interrupting other users or the chatbot (e.g., the user starts talking before the other user finishes texting or speaking). Interruptions 516-519 show when a user is "talking" over another user or the chatbot.

The AI chatbot detects intense emotions at operations 510 and 511, in addition to detecting users often interrupting each other, and the chatbot 110 responds with a positive message 513, "Any team can win! Root, root, root for the home team!" followed by a short music jingle 514.

While replaying the logs with the audio, the monitor is able to listen when the users are interrupting each other, and flags are presented showing how emotion is detected. In one-on-one conversations, there usually is a logical flow where users do not interrupt each other, but in the group setting, there could be more intense interactions and more interruptions. The replay log is able to show these interruptions.

Figure 6:
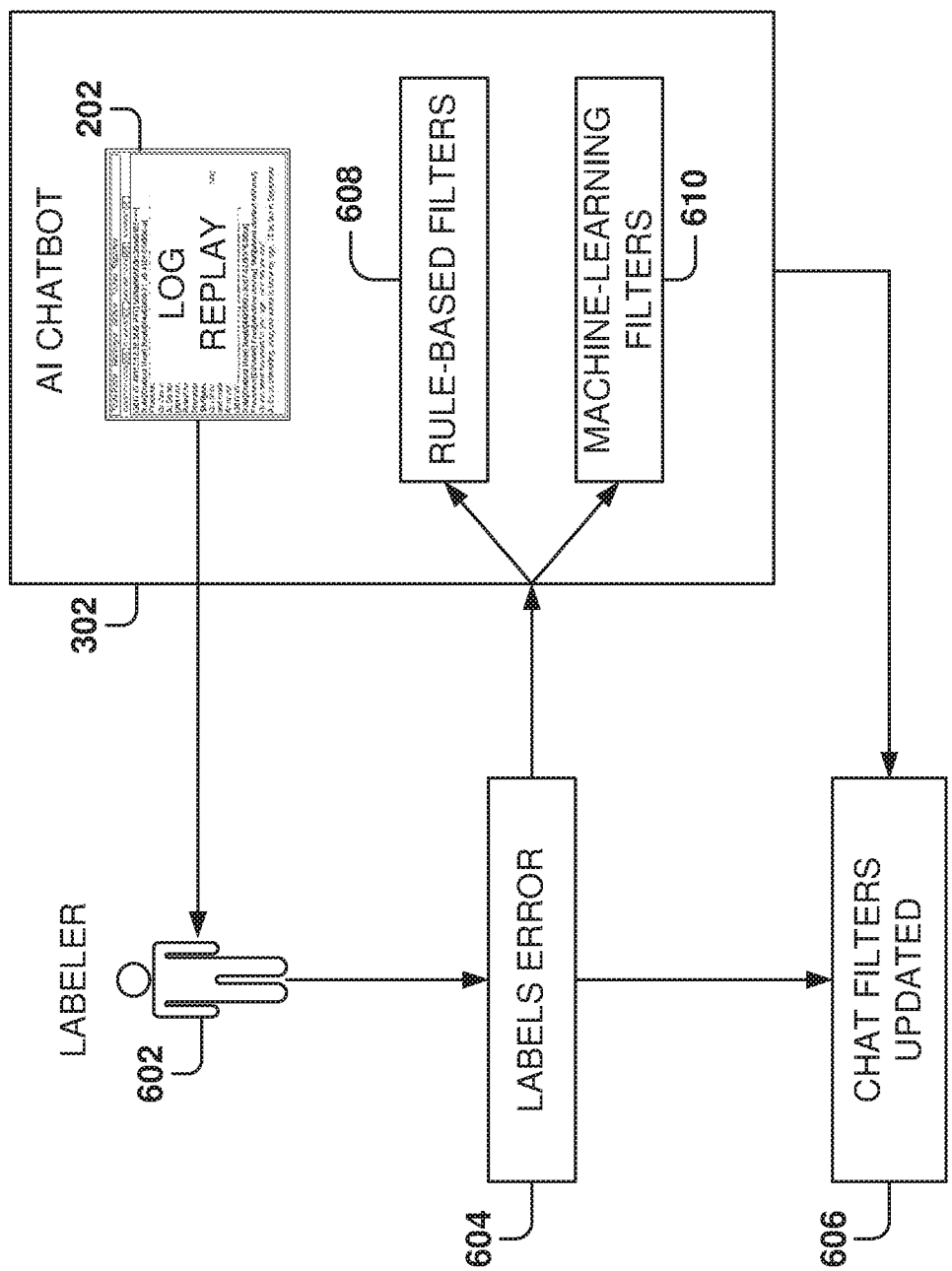
FIG. 6 illustrates the process for labeling errors in the log, according to some example embodiments.

FIG. 6 illustrates the process for labeling errors in the log, according to some example embodiments. The AI chatbot 302 includes a log-replay user interface 202, rule-based filter 608, machine-learning filters 610, and other elements, as discussed above. The rule-based filters 608 are filters used to detect offensive language during a conversation, and they may be based on some predetermined problematic words, such as racist, terrorist, hate, and the like.

The machine-learning filters 610 provide automatic detection of controversial language, based on previous data tagged by labelers and a definition of related features. More details regarding machine learning are provided below with reference to FIG. 7. The rule-based filter 608 and the machine-learning filters 610 may be utilized separately or together. Further, other heuristics filters may be used (e.g., programmed filters) besides the rule-based filters.

A human labeler 602 interfaces with the log-replay user interface 202, and when an error is found, the human labeler 602 labels the error 604. The identified error may be used to refine the rules or the machine-learning program. At operation 606, the chat filters are updated so they can be applied in future chatbot conversations.

This system is perfectly-suited for improving voice font quality. Since the chatbot data comes from a rich variety of data sources, getting the most human-like voice is difficult because the data is free-form text with many typos and lack of punctuation, which makes difficult to perfectly recreate a natural, conversational voice. Monitoring logs in this way allows labelers to go about their day passively, while still having the system logs playing in the background and observing when the naturalness of the conversation is interrupted by some dissatisfactory sound or statement.

Errors from the voice font (e.g., mispronunciation) based on certain tokens (e.g., emojis or words the chatbot does not know how to pronounce or recognize) and errors with the processing logic of the chatbot can be detected this way. This enables more people, even non-technical people, to participate in the monitoring and quality review of the chatbot.

Once an issue is identified, the labeler can pause the recorder and scroll up or down the replay screen. The labeler may click on a turn to give feedback for machine learning accuracy/training, such as quality of response, sentiment, typographical error correction, punctuation correction, and the like. The labeler may also click a button and get an audio sample with a Uniform Resource Locator (URL) copied to their clipboard immediately for sharing on social platforms or email. A high volume of issues can be captured this way, greatly helping correct issues on all pieces of the application.

The labeler 602 may label an item as either a positive or negative example, and, sometimes, label it as a chat that should be blocked. The labeler 602 may also label the emotion, such as the user experienced love, joy, laughter, sadness, and so forth. It is also possible to label the topic of the conversation, such as this is sports, politics, religion, and so forth.

An example of a filtering rule would be, "block a conversation with the word politics." In this case, blocking would mean that the chatbot would not answer or that the chatbot would offer a generic answer, which is noncommittal and evasive from the conflictive theme.

Other text debuggers require visual attention of the user to continuously monitor the text. However, the log-replay user interface 202, by providing audio output, allows monitors to engage in parallel activities without requiring complete attention to the log.

The log-replay user interface 202 is also ideal for the purpose of improving voice chatbot quality. The data comes from a variety of sources, like hand held mobile devices, where users type on small keyboards. Because the chat conversation is presented via audio, is easy to detect mispronounced words or sentences. Also, it is possible to identify if the intonation of the chatbot is incorrect in spoken conversations.

Figure 7:
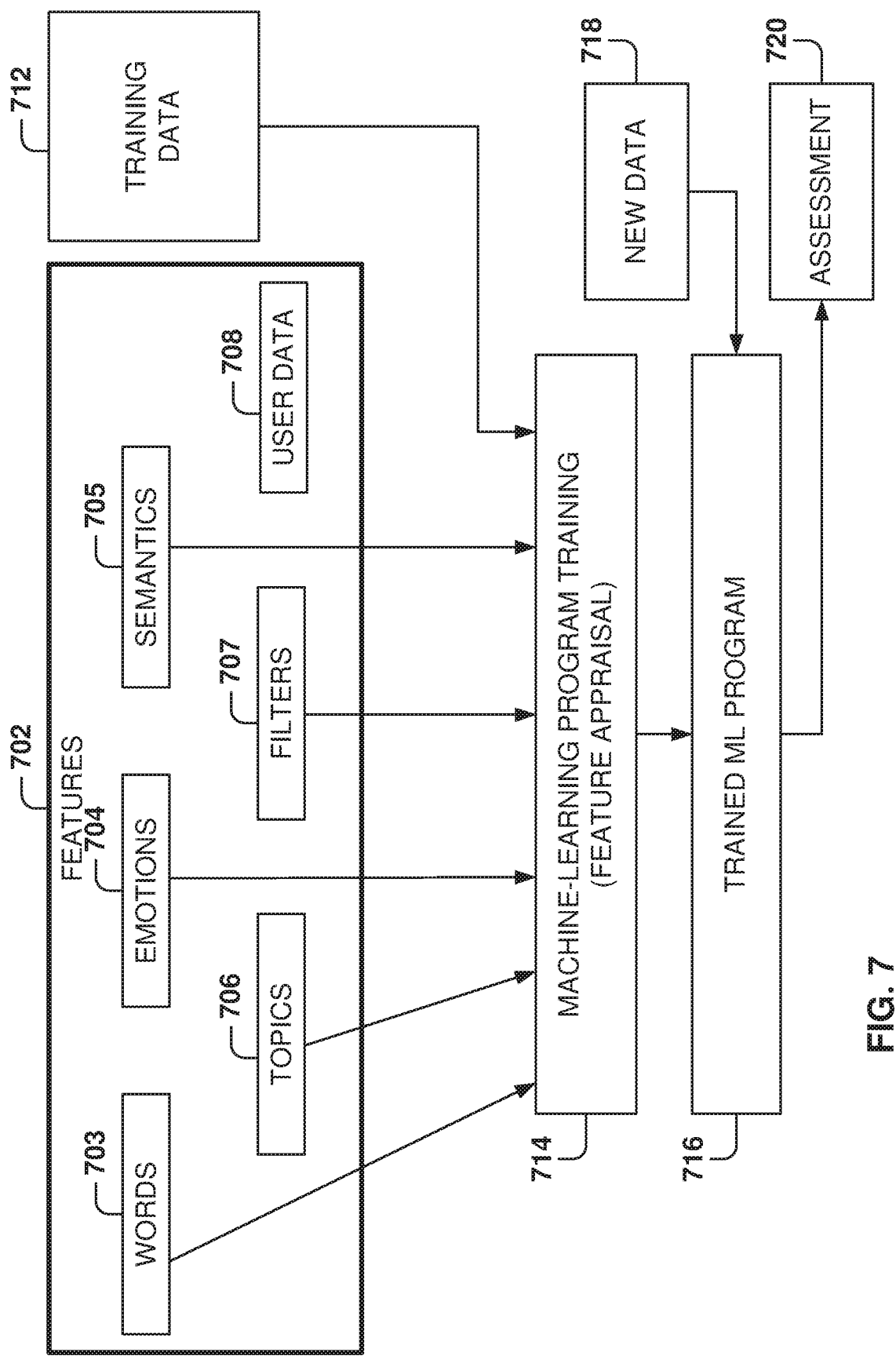
FIG. 7 illustrates the training and use of a machine-learning program, according to some example embodiments.

FIG. 7 illustrates the training and use of a machine-learning program (MLP), according to some example embodiments. In some example embodiments, MLP, also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 712 in order to make data-driven predictions or decisions expressed as outputs or assessments 720. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

There are two common types of problems in machine learning: classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide one or more of a probability that art entry includes one or more offensive topics, a classification of the entry among a plurality of possible topics, a probability of presence of one or more emotions, and values for other debugging parameters previously described.

Additionally, generative models are another type of machine-learning program that can create all values for a phenomenon, both those that can be observed in the world and "target" variables that can only be computed from those observed. Generative models are used in machine learning for either modeling data directly (e.g., modeling observations drawn from a probability density function), or as an intermediate step to forming a conditional probability density function. Examples of generative models include neural networks that produce celebrity faces from scratch, or generate music, or synthesize speech waveforms.

Another type of machine learning is reinforcement learning, which is a model that teaches itself how to learn by trial and error (by playing/exploring) so long as it can understand the rules of the environment (e.g., in the case of a computer learning how to balance a pole on a cart, similar to how a human might balance a broomstick on the palm of their hand, one can use reinforcement learning to teach the computer to teach itself to do this task, provided the program can correctly model and simulate real world phenomena during model training and running, such as gravity, angular momentum, etc.).

The machine-learning algorithms utilize features for analyzing the data to generate assessments 720. A feature 702 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 702 may be of different types and may include one or more of word features 703, emotion features 704, semantic features 705, topic features 706, filter features 707, and user data 708. The word features 703 includes words from the dictionary, or words used by users that may not be in the dictionary. The emotion feature 704 may be one of a plurality of predefined emotions, such as happy, sad, anger, joy, and the like.

Further, the semantic features 705 provide semantic information about words used by user. For example, semantic features 705 identify words that have similar meanings (e.g., synonyms). The topic features 706 identify a plurality of predefined topics, such as politics, religion, current events, sports, parenthood, babies, and so forth. The filter features 707 includes additional filters that may be utilized by the chatbot. The user data 708 includes data about the user, such as the data found in the profile of the user in a social network.

The machine-learning algorithms utilize the training data 712 to find correlations among the identified features 702 that affect the outcome or assessment 720. In some example embodiments, the training data 712 includes previous conversations held by users with the chatbot and the corresponding labels assigned by the human labelers.

With the training data 712 and the identified features 702, the machine-learning tool is trained at operation 714. The machine-learning tool appraises the value of the features 702 as they correlate to the training data 712. The result of the training is the trained MLP 716.

When the MLP 716 is used to perform an assessment, new data 718 is provided as an input to the trained machine-learning program 716, and the MLP 716 generates the assessment 720 as output. For example, when a question is submitted by a user, the MLP 716 will output an indication if the content is offensive or not.

In some example embodiments, the machine learning algorithm may identify that a subject may be offensive, but not offensive enough to block it. This type of interaction is then prioritized for review and when the monitor reviews this interaction, the monitor may decide if the content should have been blocked or not. Based on this decision, the training data may be updated to improve the prediction capabilities of the MLP.

Machine-learning algorithms may also be used to identify if a particular conversation responds to an anomaly or offensive language. The question would be: "Is this conversation significantly different from other similar conversations?". The similarity is based on statistical distribution models and what the data should look like. This way, the machine-learning program may also be utilized for automated review.

Figure 8:
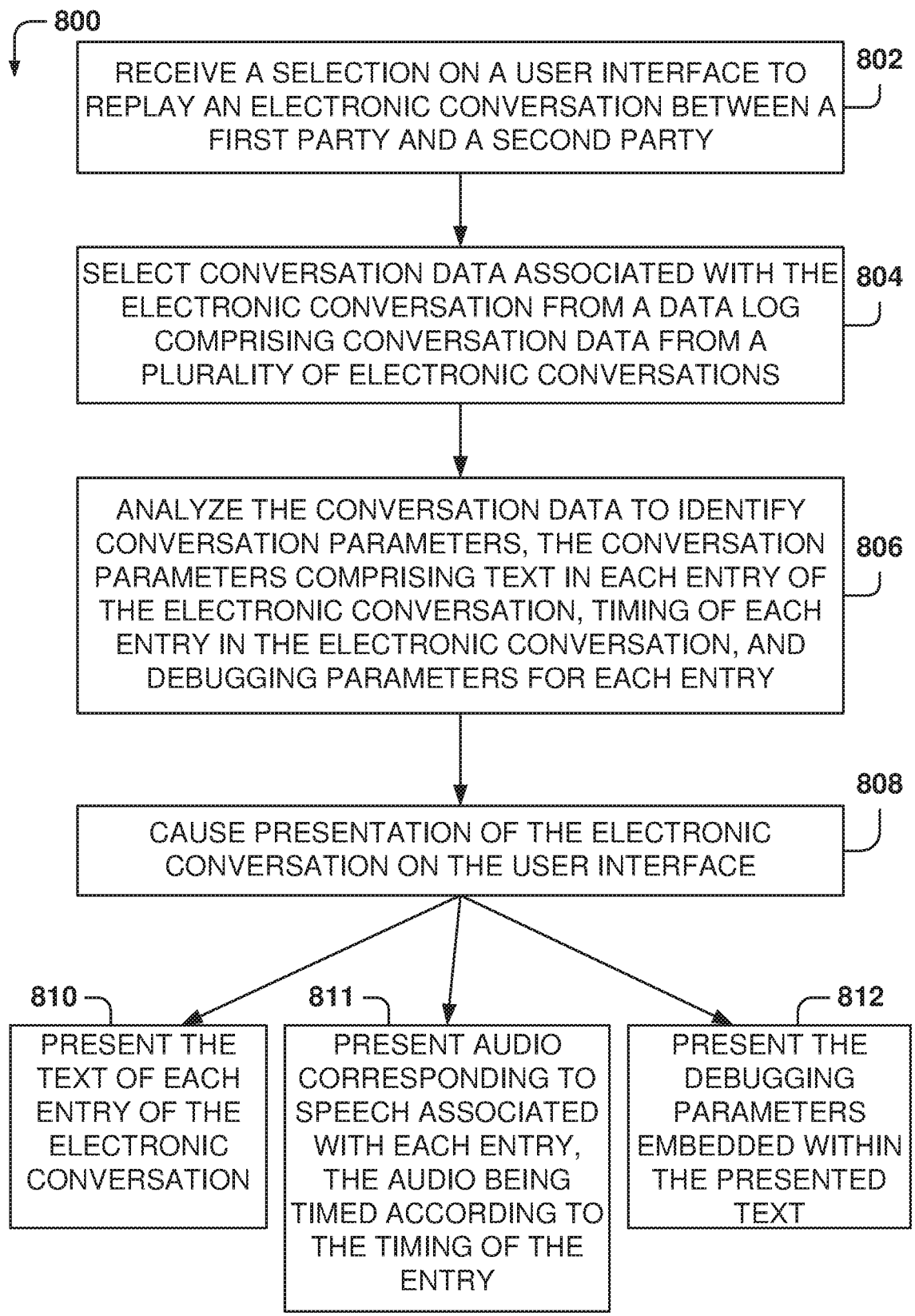
FIG. 8 is a flowchart of a method for providing a user interface for monitoring and debugging an AI chatbot, according to some example embodiments.

FIG. 8 is a flowchart of a method 800 for providing a user interface for monitoring and debugging an AI chatting bot, according to some example embodiments. While the various operations in this flowchart are presented and described sequentially, one of ordinary skill will appreciate that some or all of the operations may be executed in a different order, be combined or omitted, or be executed in parallel.

Operation 802 is for receiving, by one or more CPUs, a selection on a user interface to replay an electronic conversation between a first party and a second party. From operation 802, the method flows to operation 804 for selecting, by the one or more CPUs, conversation data associated with the electronic conversation from a data log comprising conversation data from a plurality of electronic conversations.

From operation 804, the method flows to operation 806 for analyzing, by the one or more CPUs, the conversation data to identify conversation parameters. The conversation parameters comprise text in each entry of the electronic conversation, timing of each entry in the electronic conversation, and debugging parameters for each entry.

Further, from operation 806, the method flows to operation 808 for causing presentation, by the one or more CPUs, of the electronic conversation on the user interface. The presenting comprises operations 810-812. Operation 810 is for presenting the text of each entry of the electronic conversation. Operation 811 is for presenting the audio corresponding to speech associated with each entry, with the audio being timed according to the timing of the entry. Furthermore, operation 812 is for presenting the debugging parameters embedded within the presented text.

In one example, the debugging parameters comprise a timestamp, feed identifier, and a filtered topic identifier when detected in the electronic conversation, with the filtered topic being a topic that is filtered by an electronic conversation service for being offensive.

In one example, the debugging parameters further comprise a detected emotion on one of the entries of the electronic conversation.

In one example, presenting the audio corresponding to the speech includes presenting overlapping audio when one of the parties interrupts the other party.

In one example, presenting the audio further comprises converting the text of an entry to speech utilizing a neutral speaker, wherein a voice of the party making an entry is not presented on the user interface to protect privacy of the party. Optionally, if the person has opted in to make their audio samples available, the real voice may be played instead of, or alongside with, the synthesized voice. This way, it is possible to gauge the accuracy of the speech recognition engine. Speech recognition tends to have some errors and playing text-to-speech may include the errors made by the speech-recognition program, making it difficult to follow the conversation in the presence of voice-recognition errors.

In one example, the second party is an AI chatbot.

In one example, the user interface provides an option for marking an entry as erroneous or controversial.

In one example, the method 800 further comprises receiving, via the user interface, labels corresponding to the entries while presenting the electronic conversation; and utilizing the received labels to train a machine learning program that monitors content of electronic conversations for offensive content.

In one example, the user interface includes an option to select one or more entries during the presenting, the method 800 further comprising creating a message that comprises the one or more entries, the debugging parameters corresponding to the one or more entries and an audio clip of the one or more entries; and transmitting the message.

In one example, the method 800 further comprises automatically presenting sequentially a plurality of electronic conversations on the user interface.

Figure 9:
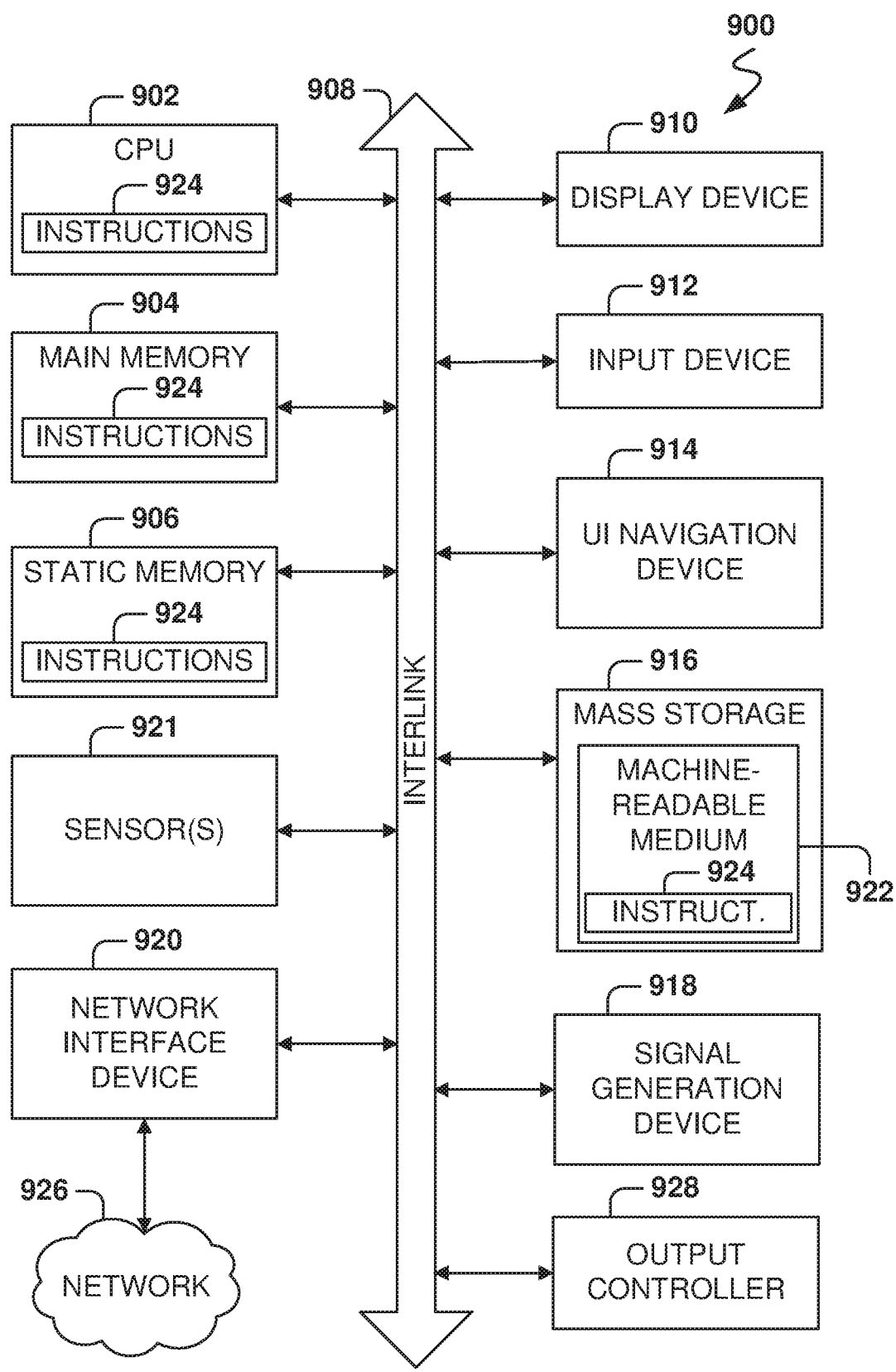
FIG. 9 is a block diagram illustrating an example of a machine upon which one or more example embodiments may be implemented.

FIG. 9 is a block diagram illustrating an example of a machine 900 upon which one or more example embodiments may be implemented. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine.

Further, while only a single machine 900 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a Central Processing Unit (CPU) 902, a main memory 904, and a static memory 906, some or all of which may communicate with each other via an interlink (e.g., bus) 908. The machine 900 may further include a display device 910, an alphanumeric input device 912 (e.g., a keyboard), and a user interface navigation device 914 (e.g., a mouse). In an example, the display device 910, input device 912, and user interface navigation device 914 may be a touchscreen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the CPU 902 during execution thereof by the machine 900. In an example, one or any combination of the CPU 902, the main memory 904, the static memory 906, or the mass storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that causes the machine 900 to perform any one or more of the techniques of the present disclosure, or that is capable of storing, encoding or carrying data structures used by or associated with such instructions 924. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 902.11 family of standards known as Wi-Fi®, IEEE 902.16 family of standards known as WiMax®), IEEE 902.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather an a restrictive sense.

What is claimed is:

1. A method comprising:
    receiving, by one or more central processing units (CPUs), a selection on a user interface to replay an electronic conversation between a first party and a chatbot, the electronic conversation comprising one or more entries having a question from the first party and an answer created by the chatbot in response to the question;
    selecting, by the one or more CPUs, conversation data of the electronic conversation from a data log comprising conversation data from a plurality of electronic conversations;
    analyzing, by the one or more CPUs, the conversation data to identify conversation parameters, the conversation parameters comprising text in each entry of the electronic conversation, timing of each entry in the electronic conversation, and debugging parameters for each entry; and
    streaming, by the one or more CPUs, the replay of the electronic conversation on the user interface, the streaming comprising:
        presenting the text of each entry of the replay of the electronic conversation;
        playing audio corresponding to speech associated with each entry of the replay of the electronic conversation, the audio being timed according to the timing of the entry, the playing of the audio using a text-to-speech conversation that presents a voice of the first party using a voice font different from a real voice of the first party, the playing of the audio artificially adding emotion when the debugging parameters include detection of emotion in the entry; and
        presenting the debugging parameters embedded within the presented text.

2. The method as recited in claim 1, wherein the debugging parameters comprise a timestamp, a feed identifier which uniquely identifies the electronic conversation from other conversations, and a filtered topic identifier when detected in the electronic conversation, the filtered topic being a topic that was filtered during the electronic conversation for being offensive.

3. The method as recited in claim 1, wherein the debugging parameters further comprise a detected emotion in one of the entries of the electronic conversation.

4. The method as recited in claim 3, wherein playing the audio corresponding to the speech includes presenting overlapping audio when one of the parties interrupts the other party.

5. The method as recited in claim 1, wherein playing the audio further comprises:
    converting the text of an entry of the electronic conversation to speech utilizing a neutral speaker, wherein a voice of the first party is not presented on the user interface to protect privacy of the first party.

6. The method as recited in claim 1, wherein the user interface provides an option for marking an entry as erroneous or controversial.

7. The method as recited in claim 1, further comprising:
    receiving, via the user interface, labels corresponding to the entries while presenting the electronic conversation; and
    utilizing the received labels to train a machine learning program that monitors content of electronic conversations for offensive content.

8. The method as recited in claim 1, wherein the user interface includes an option to select one or more entries during the presenting, the method further comprising:
    creating a message that comprises the one or more entries, the debugging parameters corresponding to the one or more entries, and an audio clip of the one or more entries; and
    transmitting the message.

9. The method as recited in claim 1, further comprising:
    automatically presenting, sequentially, a plurality of electronic conversations on the user interface.

10. The method as recited in claim 1, wherein the debugging parameters comprise a bug on code detected during the conversation, a source of data used for forming the response by the chatbot, a skill identifier which uniquely identifies a configuration utilized when the answer was created, and metadata for debugging purposes.

11. The method as recited in claim 1, wherein the debugging parameters comprise a detection of racism.

12. The method as recited in claim 1, wherein playing audio further includes:
    playing the audio utilizing playback parameters, the playback parameters including voices selected for speech representation, text fonts for presenting the text of each entry, and debugging parameters presented embedded within the streaming of the text.

13. The method as recited in claim 1, wherein playing the audio further comprises:
    when anger is detected in the electronic conversation, providing an angry voice font to play the audio to alert a human monitor of a possibility of problems.

14. A system comprising:
    a memory comprising instructions; and
    one or more CPUs, wherein the instructions, when executed by the one or more CPUs, cause the one or more CPUs to perform operations comprising:
        receiving a selection on a user interface to replay an electronic conversation between a first party and a chatbot, the electronic conversation comprising one or more entries having a question from the first party and an answer created by the chatbot in response to the question;

selecting conversation data of the electronic conversation from a data log comprising conversation data from a plurality of electronic conversations;

analyzing the conversation data to identify conversation parameters, the conversation parameters comprising text in each entry of the electronic conversation, timing of each entry in the electronic conversation, and debugging parameters for each entry; and streaming the replay of the electronic conversation on the user interface, the streaming comprising:

presenting the text of each entry of the replay of the electronic conversation;

playing audio corresponding to speech associated with each entry of the replay of the electronic conversation, the audio being timed according to the timing of the entry, the playing of the audio using a text-to-speech conversation that presents a voice of the first party using a voice font different from a real voice of the first party, the playing of the audio artificially adding emotion when the debugging parameters include detection of emotion in the entry; and presenting the debugging parameters embedded within the presented text.

15. The system as recited in claim 14, wherein the debugging parameters comprise a timestamp, a feed identifier which uniquely identifies the conversation from other conversations, and a filtered topic identifier when detected in the electronic conversation, the filtered topic being a topic that was filtered during the electronic conversation for being offensive.

16. The system as recited in claim 14, wherein the debugging parameters further comprise a detected emotion on one of the entries of the electronic conversation.

17. The system as recited in claim 16, wherein playing the audio corresponding to the speech includes presenting overlapping audio when one of the parties interrupts the other party.

18. The system as recited in claim 14, wherein playing the audio further comprises:

converting the text of an entry of the electronic conversation to speech utilizing a neutral speaker, wherein a voice of the first party is not presented on the user interface to protect privacy of the first party.

19. A non-transitory machine-readable storage medium including instructions that, when executed by a machine, cause the machine to perform operations comprising:

receiving a selection on a user interface to replay an electronic conversation between a first party and a chatbot, the electronic conversation comprising one or more entries having a question from the first party and an answer created by the chatbot in response to the question;

selecting conversation data of the electronic conversation from a data log comprising conversation data from a plurality of electronic conversations;

analyzing the conversation data to identify conversation parameters, the conversation parameters comprising text in each entry of the electronic conversation, timing of each entry in the electronic conversation, and debugging parameters for each entry; and streaming the replay of the electronic conversation on the user interface, the streaming comprising:

presenting the text of each entry of the replay of the electronic conversation;

playing audio corresponding to speech associated with each entry of the replay of the electronic conversation, the audio being timed according to the timing of the entry, the playing of the audio using a text-to-speech conversation that presents a voice of the first party using a voice font different from a real voice of the first party, the playing of the audio artificially adding emotion when the debugging parameters include detection of emotion in the entry; and presenting the debugging parameters embedded within the presented text.

20. The machine-readable storage medium as recited in claim 19, wherein the debugging parameters comprise a timestamp, a feed identifier which uniquely identifies the conversation from other conversations, and a filtered topic identifier when detected in the electronic conversation, the filtered topic being a topic that was filtered during the electronic conversation for being offensive.

21. The machine-readable storage medium as recited in claim 19, wherein the debugging parameters further comprise a detected emotion on one of the entries of the electronic conversation.

22. The machine-readable storage medium as recited in claim 21, wherein playing the audio corresponding to the speech includes presenting overlapping audio when one of the parties interrupts the other party.

23. The machine-readable storage medium as recited in claim 19, wherein playing the audio further comprises:

converting the text of an entry of the electronic conversation to speech utilizing a neutral speaker, wherein a voice of the first party is not presented on the user interface to protect privacy of the first party.

* * * * *